United States Patent [19]

Borsuk

[11] 4,081,564
[45] Mar. 28, 1978

[54] METHOD AND APPARATUS FOR CONTINUOUSLY MAKING LOAF MEAT

[75] Inventor: Alvin Borsuk, Madison, Wis.

[73] Assignee: Oscar Mayer & Co. Inc., Madison, Wis.

[21] Appl. No.: 557,400

[22] Filed: Mar. 11, 1975

[51] Int. Cl.² .......................... A22C 7/00; A23L 1/01
[52] U.S. Cl. .................................... 426/513; 99/355; 99/352; 99/427; 99/443 C; 426/512; 426/516; 426/811
[58] Field of Search ............... 426/513, 811, 523, 516, 426/517, 512, 389; 99/427, 439, 441, 443 R, 443 C, 357, 353, 355, 448, 416, 417, 352; 17/32

[56] References Cited

U.S. PATENT DOCUMENTS

| | | | |
|---|---|---|---|
| 1,483,704 | 2/1924 | Wilcox | 426/811 X |
| 2,196,080 | 4/1940 | Reynoldson | 426/513 |
| 2,887,382 | 5/1959 | Rivoche | 426/512 X |
| 3,122,243 | 2/1964 | Hawley | 99/443 R X |
| 3,167,000 | 1/1965 | Sassen et al. | 99/441 X |
| 3,435,755 | 4/1969 | Lohr et al. | 99/443 R X |
| 3,561,373 | 2/1971 | Sievert | 99/352 X |
| 3,638,554 | 2/1972 | Ackroyd | 426/513 X |
| 3,702,583 | 11/1972 | Rullman | 99/443 C X |
| 3,740,235 | 6/1973 | Weiner | 426/513 X |
| 3,747,508 | 7/1973 | Elam | 99/443 C X |
| 3,796,144 | 3/1974 | Foldenauer et al. | 99/441 X |

FOREIGN PATENT DOCUMENTS 546,522  9/1957  Canada .................................. 426/513

*Primary Examiner*—S. Leon Bashore
*Assistant Examiner*—Kenneth M. Schor
*Attorney, Agent, or Firm*—Lockwood, Dewey, Zickert & Alex

[57] ABSTRACT

Method and apparatus for making a molded meat product on a continuous basis, including the stuffing of a meat material into molds, where a plurality of molds are arranged together in a magazine and a plurality of magazines are utilized in the continuous process. The method and apparatus further includes a closed loop through which the magazines are driven incrementally through cooking, chilling, product knockout, washing and release agent application stations. The magazines of molds are removed from the closed loop for stuffing of the meat material and then reinserted in the closed loop to be processed in the stations of the closed loop.

18 Claims, 8 Drawing Figures

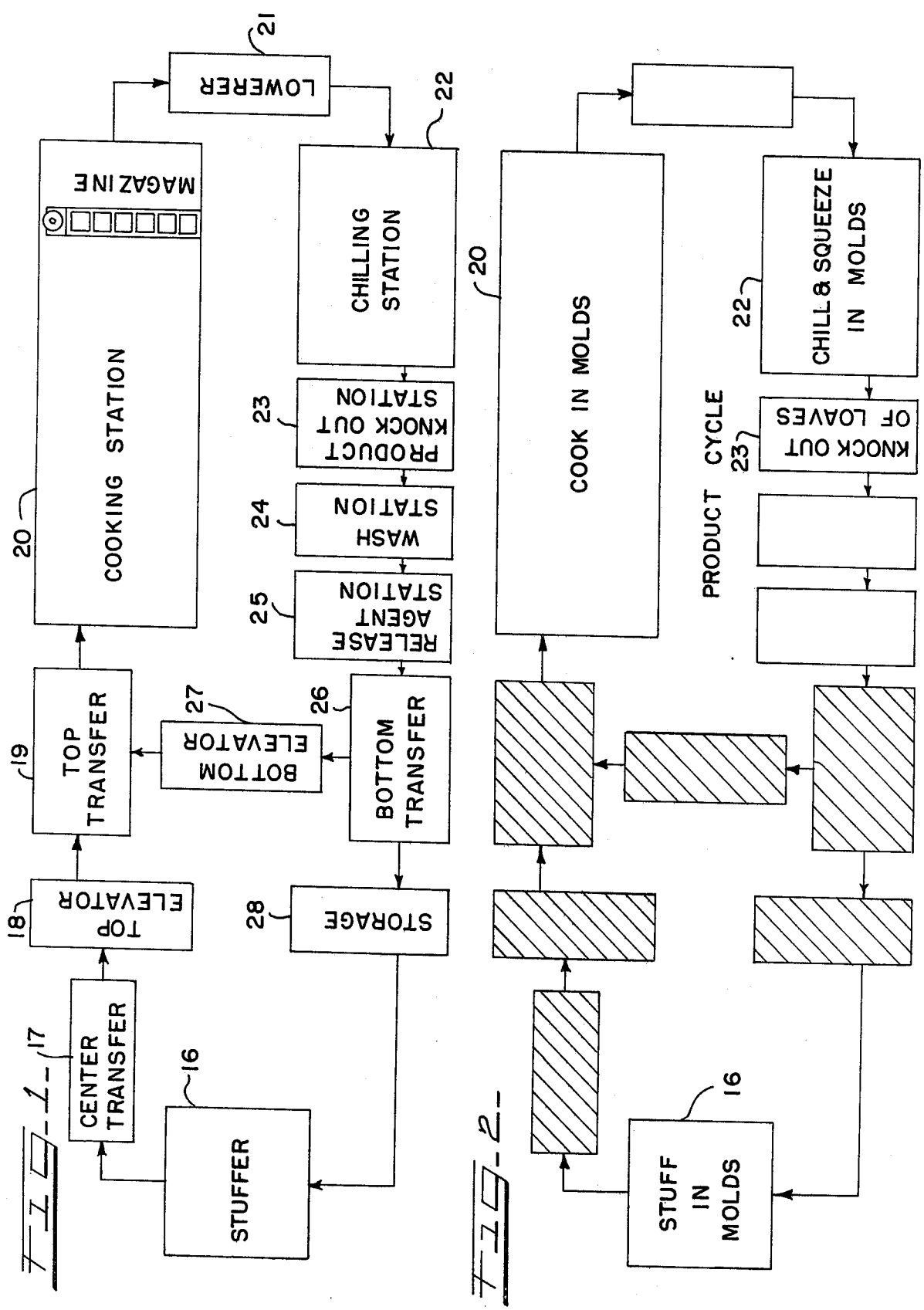

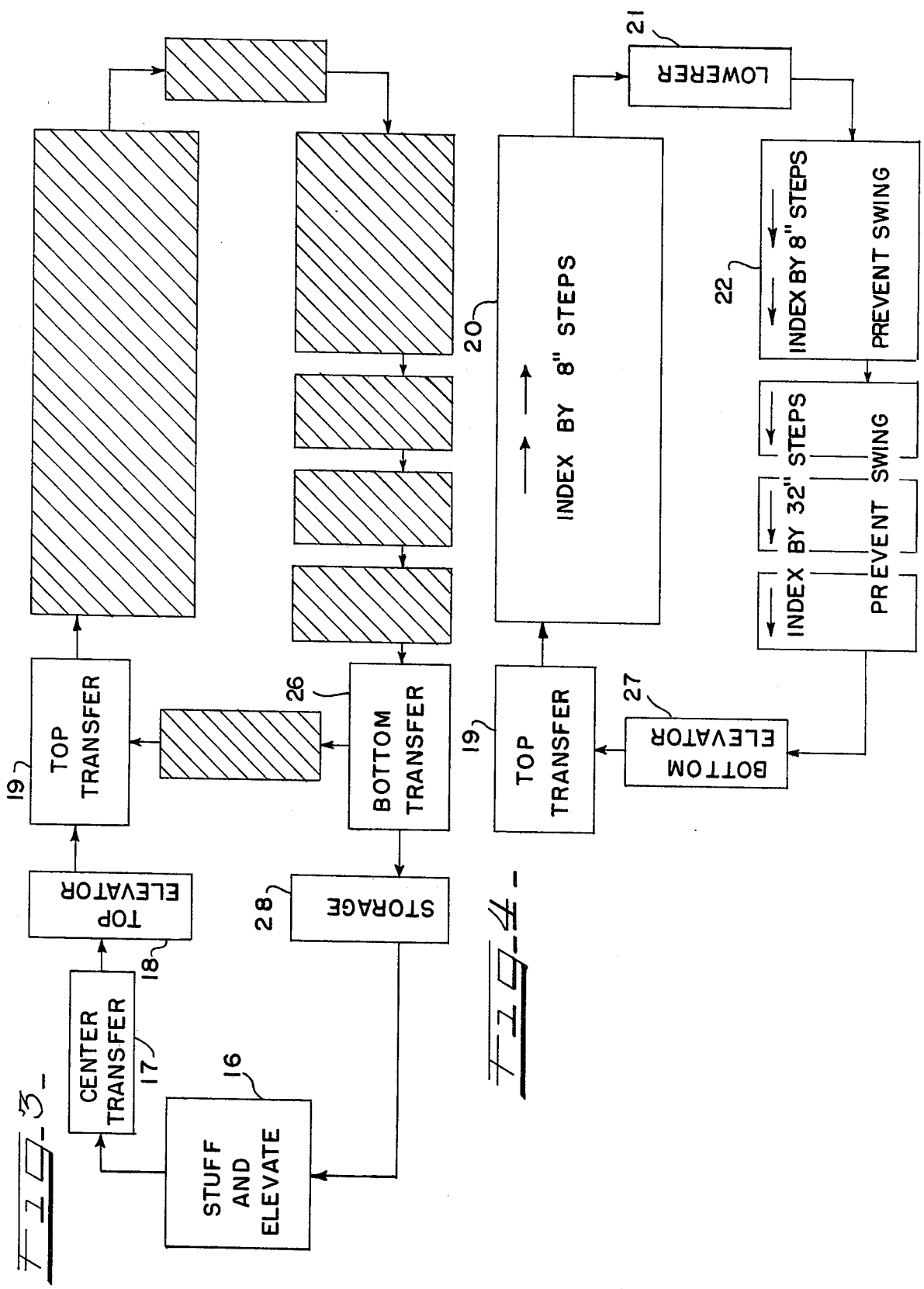

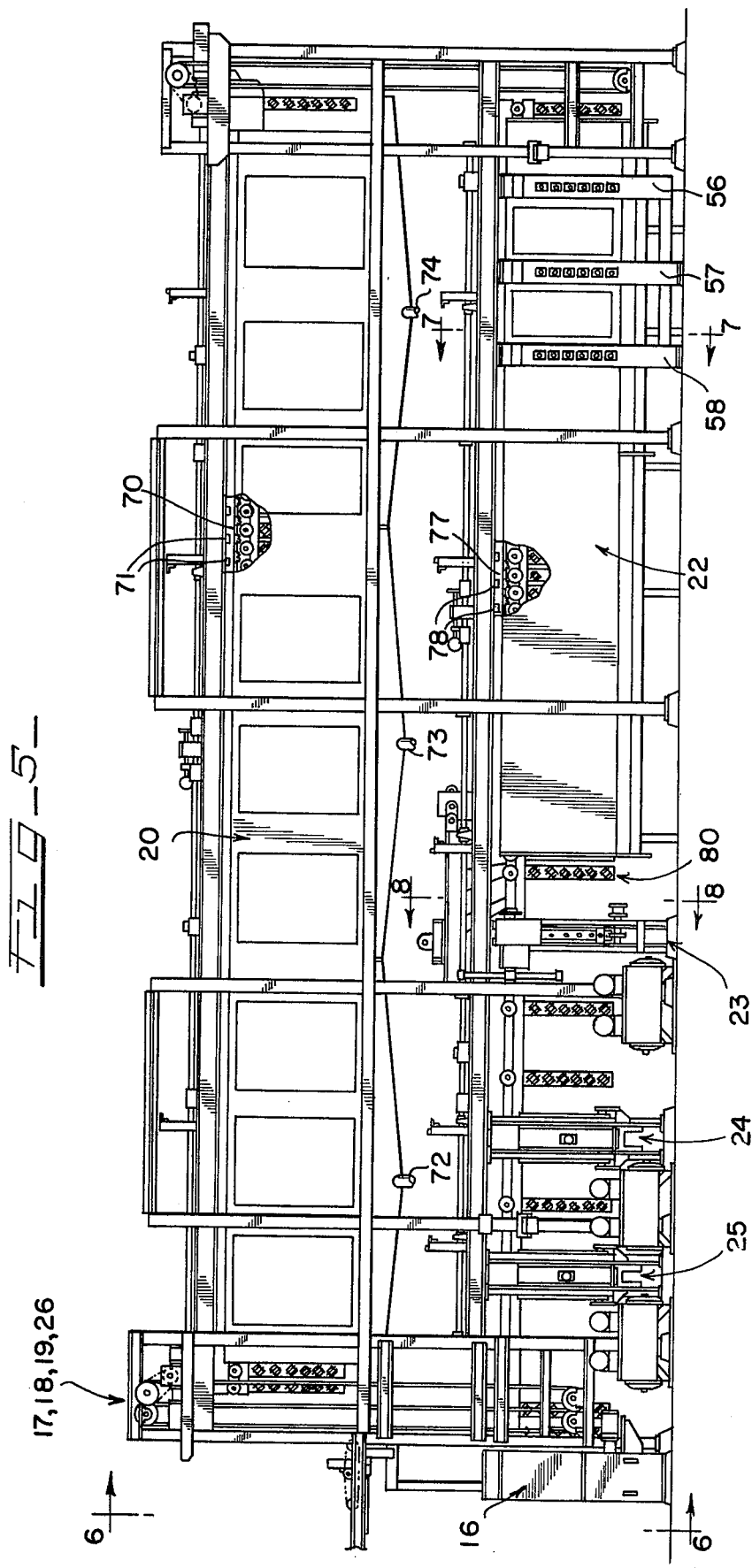

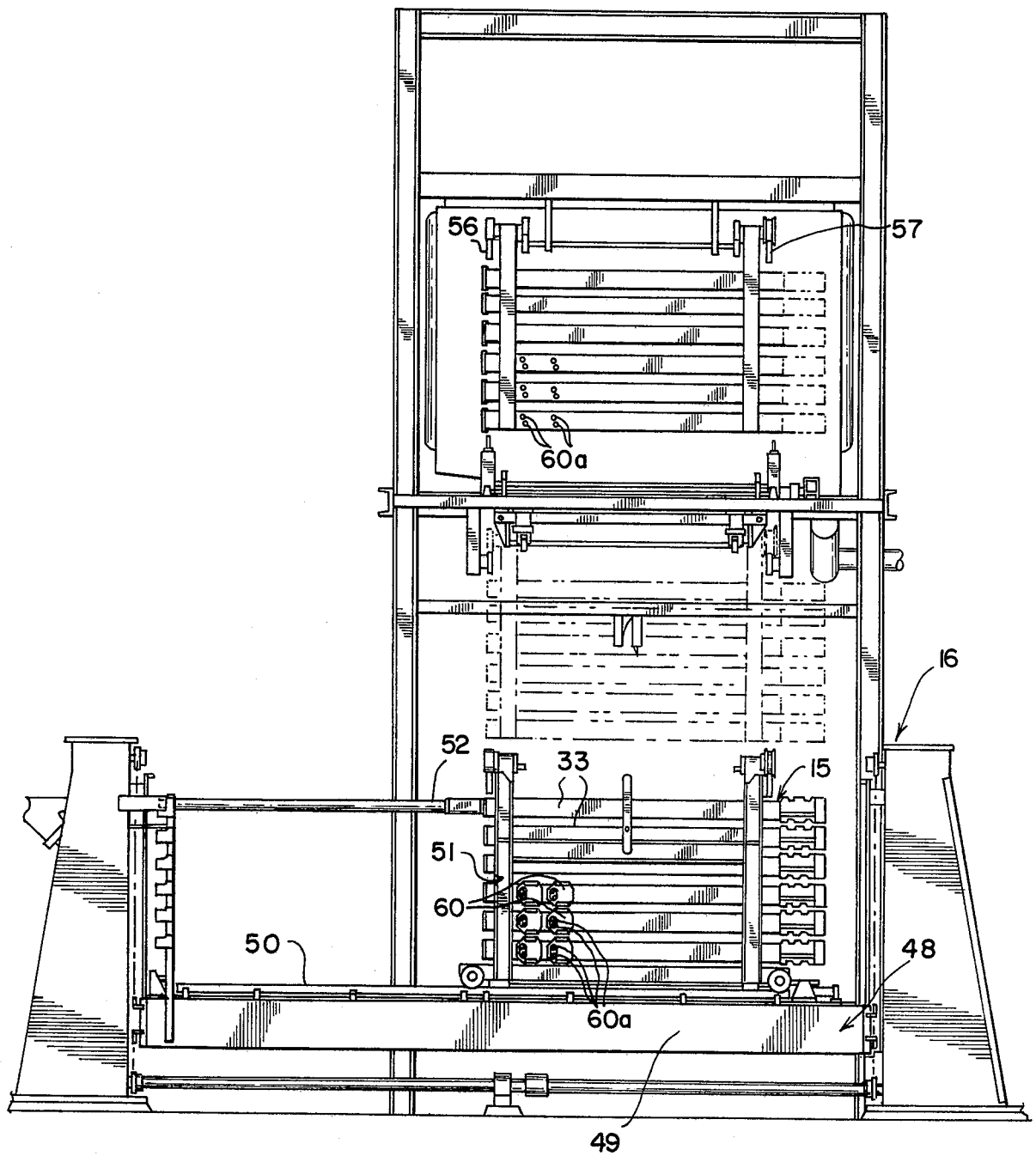
FIG_6_

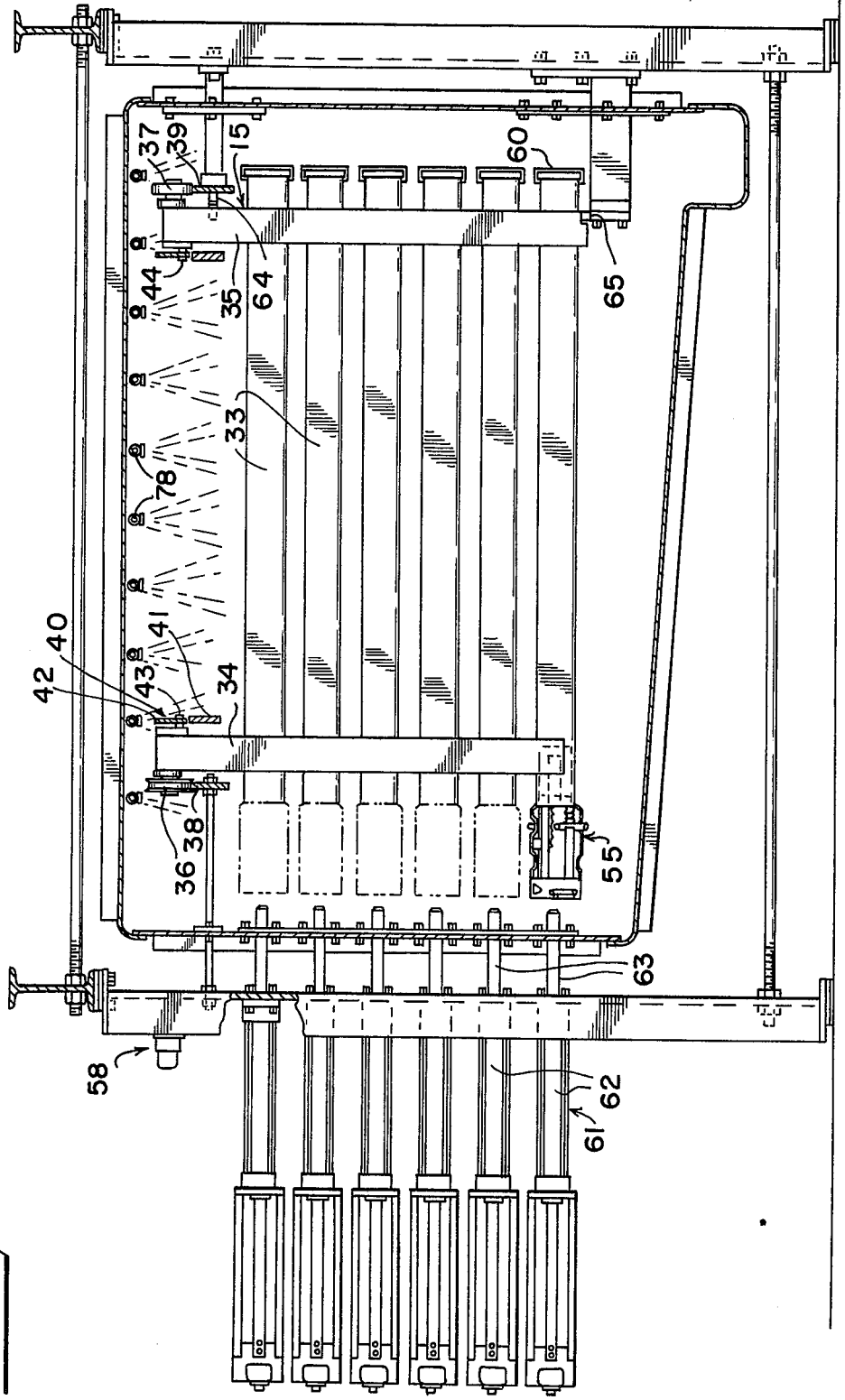

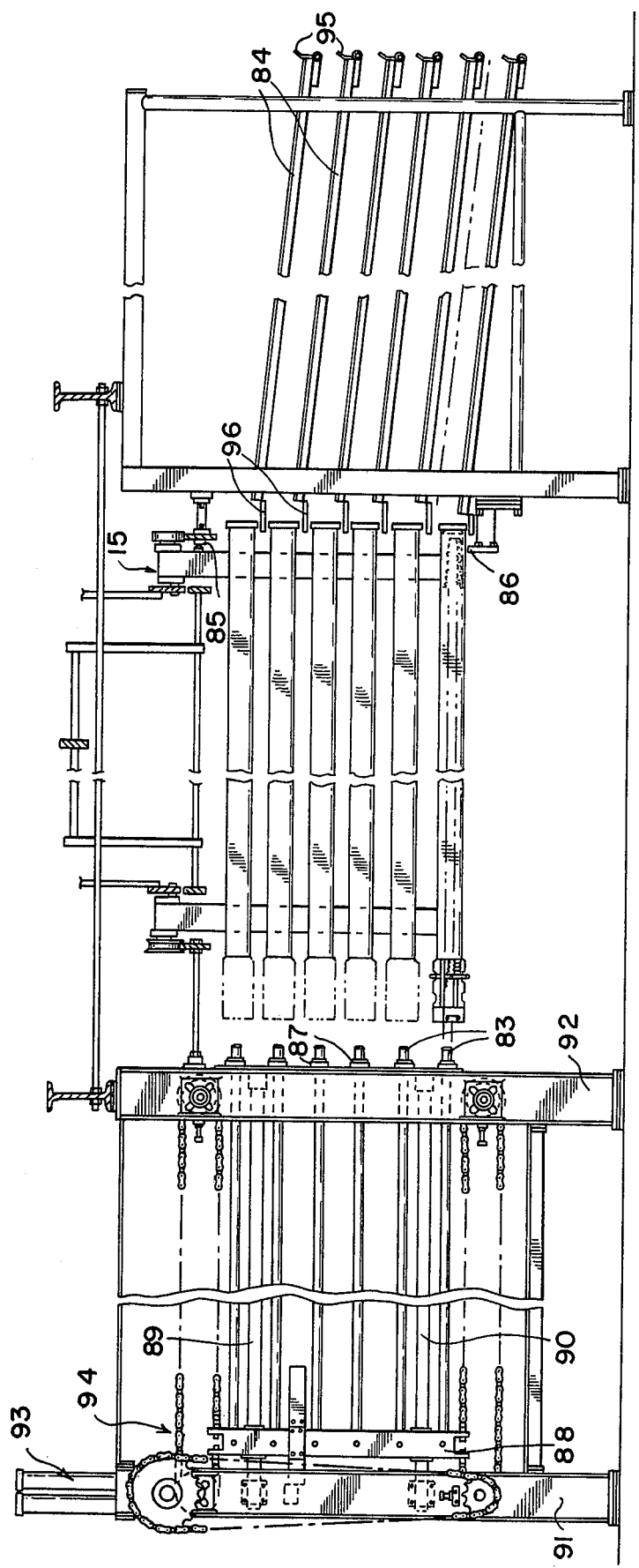

METHOD AND APPARATUS FOR CONTINUOUSLY MAKING LOAF MEAT

This invention relates in general to a method and apparatus for continuously making a loaf food product, and more particularly, to a method and apparatus for continuously making a finished loaf meat product from a stuffable meat material.

Heretofore, it has been well known to make loaf meats from a stuffable meat material by stuffing a raw meat material, such as sausage batter or chunk meat, into molds or forms and thereafter processing the molds with the meat material, resulting in a cooked and ready-to-eat meat product.

The method and apparatus of the present invention are concerned with continuously making a loaf meat product from a stuffable meat material having uniform dimensions and a uniform high quality. A plurality of magazines of molds are sequentially advanced in a closed loop through cooking, chilling, product knockout, washing, and release agent application stations. The magazines are periodically removed from the closed loop downstream of the release agent application station, advanced to a stuffing station where the molds are filled with a stuffable meat material, and then reinserted into the closed loop upstream of the cooking station.

At the release agent application station, a suitable release agent is applied to the molds prior to stuffing the molds with a meat material in order to enhance removal of the cooked and chilled meat product at the product knockout station. Stuffing of the molds with a raw sausage batter or chunk meat is controlled at the stuffing station in order to obtain uniformly stuffed molds. During movement of the magazines of molds with the stuffed meat through the cooking station, the molds are subjected to heat for a given period of time such as to increase the internal temperature of the meat to a given temperature which then assures the meat is properly cooked. Following the cooking of the meat, the molds are subjected to a chilling action sufficient to decrease the internal temperature of the meat to a given temperature to firm up the meat for removal from the molds. Because the stuffable meat material will expand during the cooking operation, means is provided for permitting the expansion without distorting the shape of the molds. Further, because the meat will contract or shrink during the chilling operation, means is provided to squeeze or compact the meat within the molds in order to obtain a uniformly dimensioned ultimate meat product.

Following the knockout of the meat product at the knockout station, the magazines of molds are automatically washed and a release agent is automatically applied to the molds in preparation for the next stuffing operation.

The apparatus of the invention further includes in the closed loop a magazine transport mechanism that advances the magazines in incremental steps on a time cycle basis. The transport mechanism is arranged in upper and lower runs wherein the cooking station is in the upper run, while the chilling, product knockout, mold wash, and release agent application stations are in the lower run. Mechanism is provided for lowering the magazines from the upper run to the lower run and for lifting the magazines from the lower run to the upper run at the opposite ends of the runs. Further, mechanism is provided for removing magazines from the closed loop to the stuffing station and thereafter reinserting the magazines into the closed loop. Electronic controllers monitor and signal driving mechanism for causing movement of the magazines in the closed loop and movement of magazines to and from the stuffing station. Manual controls are provided at the stuffing station to control the stuffing operation. Operators are also provided at the product knockout station for conditioning the molds prior to product knockout and thereafter handling the product.

It is therefore an object of the present invention to provide a method of continuously making a loaf food product from a stuffable food material by utilizing a plurality of magazines of molds and transporting the magazines in a closed loop through cooking, chilling, product knockout, mold wash, and mold release agent application stations, and removing magazines of molds from the closed loop for transfer to a stuffing station where the molds are filled with a stuffable food material and thereafter the magazines are reinserted into the closed loop.

It is a further object of the present invention to provide a method for a continuous loaf process system utilizing magazines of molds, wherein the food product is squeezed during shrinkage in a chilling station to ultimately provide a product having a uniform dimension definable by the mold.

A still further object of this invention is in the provision of a method for making a loaf food product from a stuffable food material in a continuous process, including the steps of cooking the food material while in the molds and chilling the food material while in the molds, wherein cooking is obtained by spraying water of a given temperature onto the molds as they move through a closed chamber and chilling of the food product is achieved by spraying water over the molds having a given temperature as the molds are moved through a closed chamber.

A further object of the present invention is to provide an apparatus for continuously making a loaf food product from a stuffable meat material by utilizing a plurality of magazines, each of which has a plurality of molds and a transport system for incrementally moving the magazines through a closed loop having cooking, chilling, product knockout, mold wash and mold release agent application stations, together with a stuffing station outside of the closed loop and means for taking magazines from the closed loop and placing them in the stuffing station and then reinserting the magazines into the closed loop following the stuffing operation.

A still further object of the present invention is to provide apparatus for continuously making a loaf food product from a stuffable food material and including mechanism for squeezing the product at the chilling station to provide a product having a uniform cross section.

Other objects, features and advantages of the invention will be apparent from the following detailed disclosure, taken in conjunction with the accompanying sheets of drawings, wherein like reference numerals refer to like parts, in which:

FIG. 1 is a block diagram illustrating the overall continuous loaf processing system according to the invention and showing the flow of mold magazines in the closed loop and in and out of the closed loop at the stuffing station;

FIG. 2 is a block diagram similar to FIG. 1, which emphasizes and illustrates the product cycle in the continuous loaf process system of the invention;

FIG. 3 is a block diagram similar to FIGS. 1 and 2 but illustrating particularly the transport of magazines in the stuffing loop;

FIG. 4 is a block diagram similar to the diagrams of FIGS. 1 to 3 but illustrating only the magazine transport closed loop;

FIG. 5 is a side elevational view of the apparatus of the present invention for producing the continuous making of loaf food product;

FIG. 6 is a somewhat simplified enlarged view taken substantially along line 6—6 of FIG. 5 to show the stuffing end of the apparatus;

FIG. 7 is an enlarged transverse sectional view taken substantially along line 7—7 of FIG. 5 for illustrating one of the mechanisms for obtaining product squeeze in the chilling station; and FIG. 8 is a transverse sectional view taken through the machine substantially along the line 8—8 of FIG. 5 to illustrate the product knockout mechanism.

The continuous loaf process system of the present invention continuously processes loaf food products. Generally, a stuffable food material is stuffed into molds which are subjected to heat for cooking the food material, subjected to chilling to chill the food material, and then removed from the molds as a cooked and ready-to-eat food product that may thereafter be sliced or sectioned and packaged for sale to the consumer. The invention is principally concerned with the product of a loaf meat product and will be hereinafter described in connection with producing a meat product, although it should be appreciated the invention could be used for other food products if so desired.

The continuous loaf process system may be used to process any desired type of material to produce any desired type of loaves. Any type of stuffable meat product may be used, such as sausage batter or chunk meat. In accordance with the invention, a raw meat product mixture is stuffed into the molds which are then processed to produce the ready-to-eat loaf meat product.

The meat material is stuffed into molds at a stuffing station which molds have been previously cleaned and coated with a suitable release agent. A magazine of stuffed molds is then inserted into a closed loop having a transport system for moving the magazines incrementally through cooking, chilling, product knockout, mold wash and mold release agent application stations. When a magazine is inserted into a closed loop, another is removed from the closed loop for the stuffing station. As seen generally in the flow diagram of FIG. 1, a magazine of molds 15, such as shown in FIG. 7, according to the method of the present invention, is filled or stuffed with a meat material at the stuffing station 16. Following the stuffing operation, the magazine is moved by a center transfer mechanism 17 from the stuffing carriage at the stuffing station to a top elevator 18. The top elevator moves upwardly to a given position with the magazine of molds where a top transfer mechanism 19 transfers the magazine into the cooking station 20. As seen in FIG. 2, the meat material is cooked in the molds while in the cooking station 20, and as seen in FIG. 4, the magazines are indexed through the cooking station by eight-inch steps. Of course, it should be appreciated that the length of the steps can be whatever is desired.

Following the cooking operation, the magazines are transferred by the lowerer mechanism 21 to the chilling station 22. During movement of the magazines through the chilling station where the magazines are also indexed by eight-inch steps, as shown in FIG. 4, the cooked meat material in the molds is squeezed or compacted to compensate for shrinkage and ultimately provide a uniformly dimensioned product. This also prevents mottling of the product. Conversely, the molds are constructed to allow expansion of the product during cooking in the cooking station 20 to prevent any possible distortion of the molds.

After leaving the chilling station 22, the magazines are advanced to a product knockout station 23 where the loaves are removed from the molds. As seen in FIG. 2, the product cycle involves stuffing meat material in the molds at the stuffing station 16 to form a loaf product, cooking the meat material in the molds at the cooking station 20, chilling and squeezing the meat material at the chilling station 22, and removing the loaves from the molds at the product knockout station 23.

After the product has been removed from the molds, the magazines advance to the mold wash station 24, where the molds are thoroughly cleaned and sanitized. Next, the molds are dried when the magazines are advanced to the release agent application station 25. Also, at the release agent application station, a suitable release agent is applied to the interior of the molds to facilitate removal of the loaves at the knockout station. During movement of the magazines from the chilling station through the product knockout, mold wash, and release agent application stations, the magazines are indexed by 32-inch steps or much larger steps to provide ample room for these stations, and to use fewer magazines for the same capacity.

In the event the stuffing station 16 is not in operation, it being appreciated the magazine transport mechanism in the closed loop continuously advances the magazines on a timed cycle, when a magazine leaving the release agent application station 25 moves onto the bottom elevator 27, it is moved directly up to the cook level where the top transfer mechanism then transfers the magazine into the cooking station 20. When a magazine is released from the stuffing station and inserted into the closed loop, the magazine is transferred from the bottom elevator by the bottom transfer mechanism 26 to a storage area 28. From the storage area 28 magazines are manually transferred to the stuffing carriage at the stuffing station 16 by the operator at the stuffing station. The stuffing loop is illustrated in FIG. 3, where a magazine of molds may be transferred from the closed loop by the bottom transfer mechanism 26 to the storage area 28. Thereafter, a magazine may be taken from the storage area to the stuffing station 16 and elevated to the center transfer mechanism 17 following stuffing of the molds which transfers the magazine to the top elevator mechanism 18 that places the magazine back into the closed loop by action of the top transfer mechanism 19.

The magazine of molds 15, as seen most clearly in FIG. 7, includes a plurality of horizontally extending and vertically arranged molds 33 secured together in vertically spaced relation by vertically extending stringers or forks 34 and 35 adjacent the opposite ends of the molds. Supporting rollers 36 and 37 are suitably mounted at the upper ends of the stringers 34 and 35 respectively and coact with horizontally extending tracks 38 and 39 respectively that extend along the upper end of the machine, as shown in FIG. 5, in the cooking station 20 and along the lower level of the machine in the chilling station 22, the knockout station 23, the mold wash station 24 and the release agent application station 25. A "walking beam" conveyer 40 having a system of moving and locking bars 41 and 42 respectively having pin slots engage magazine pins 43 and 44 carried on the stringers 34 and 35 respectively to index the magazines along the tracks 38 and 39. The locking bars move up and down into and out of engagement with the magazine pins of each magazine while the moving bars 41 move up and down and back and forth to cause movement of the magazines from one index position to another. The locking bars engage the pins and hold the magazine in a given position when the moving bars are disengaged and moving horizontally for positioning to obtain subsequent engagement of the magazine pins for movement of same. When the moving bars engage the pins, the locking bars disengage.

The walking beam conveyer forms no part of the present invention and is being only generally described for purposes of understanding the manner in which the magazines may be moved through the various stations. The walking beam conveyer is the subject of another application (Ser. No. 557,301, filed Mar. 11, 1975 now U.S. Pat. No. 3,970,008) owned by the assignee of this application. Within the scope of the present invention, other types of indexing mechanisms may be provided to move the magazines.

Also, the magazine assembly forms no part of the present invention, as it can be appreciated that other types of magazine assemblies may be used in the overall continuous loaf process, and the magazine assembly is the subject of another application (Ser. No. 557,302, filed Mar. 11, 1975 now U.S. Pat. No. 4,009,858) which is owned by the assignee of the present application.

While the magazines are shown in the apparatus of the invention as in FIG. 5 to be advanced through chilling, product knockout, mold wash, and release agent application stations along one level, and the cooking station along a level directly above the level of the previous stations, it can be appreciated that the overall process of the present invention could be carried out in connection with apparatus where all stations would be on the same level. In terms of floor space, the arrangement where the cooking level is directly above the chilling level, less floor space is needed than if all of the levels would be the same.

The apparatus at the stuffing station includes a stuffing assembly 48 onto which a magazine assembly 15 is positioned and locked into place during the stuffing operation. The stuffing assembly 48 includes a vertically movable track support 49 having a track 50 onto which a horizontally movable stuffing carriage 51 controls movement of a magazine 15 onto and off of a stationary stuffing horn 52. Accordingly, the stuffing assembly 48 generally includes a vertically movable track support 49 and a stuffing carriage 51. Suitable means is provided to drive the stuffing carriage 51 in the direction of the stuffing horn 52 wherein a mold of the magazine assembly is positioned around the stuffing horn. A suitable deaerated meat material is pumped through the stuffing horn 52 when the stuffing horn is completely within a mold and the pressure of the meat material then forces the stuffing carriage 51 back to the position shown in FIG. 6 until the mold is completely filled with meat material. Any suitable means may be used to drive the stuffing carriage 51 so a mold moves onto the stuffing horn 52, such as by a hydraulic cylinder. Further, the return movement of the carriage is suitably retarded to assure proper filling of the mold with meat material.

Following the filling of one mold, the stuffing assembly track support 49 is indexed upwardly by suitable mechanism to place the next mold in alignment with the stuffing horn for filling. Sequentially, the molds are filled by indexing upwardly and when the last mold has been filled, the magazine assembly is disengaged by the stuffing carriage 51 and engaged by the center transfer and transferred to the top elevator 18, after which it is elevated to the upper position shown in FIG. 6 and transferred by the top transfer mechanism 19 onto the cook rails 56 and 57 which extend through the cooking chamber. As previously indicated, when the magazines reach the exit end of the cooking station, they are handled by the lowerer 21 to lower them down to the chill rails for movement into the chill station 22. The details of the stuffing station 16 and the stuffing mechanism are not provided as the stuffing apparatus does not form any part of the present invention and is the subject matter of other applications (Ser. No. 557,399, filed Mar. 11, 1975 now U.S. Pat. No. 4,017,940 and Ser. No. 557,257, filed Mar. 11, 1975 now U.S. Pat. No. 3,967,559) assigned to the assignee of this application.

As before indicated, the molds 34 may take any suitable cross-sectional shape but are here shown to be square in cross section and tubular wherein a movable plastic plug is provided at one end associated with a ratchet mechanism 55 that allows expansion of the meat material in the cooking station and also permits squeezing of the meat material in the chilling station. The ratchet mechanism forms no part of the present invention and is the subject matter of a separate application (Ser. No. 557,300, filed Mar. 11, 1975 now U.S. Pat. No. 3,982,477) owned by the assignee of this application.

At the chilling station 22 there are provided, as seen in FIG. 5, first, second and third product squeeze or compacting mechanisms 56, 57 and 58. Accordingly, the molds 33 are closed at one end by a movable plastic plug, while they are closed at the other end by a cover 60 that slidably fits over the flanged end of the molds after the molds have been filled with the meat material. Any suitable mechanism may be provided for producing the squeeze of the meat material in the molds at the chilling station, but an apparatus 61 is illustrated in FIG. 7 which includes a plurality or gang of pneumatic cylinders 62 having pistons 63 which can engage the plugs and apply a force against the plugs to squeeze the meat material within the molds. The mechanism for obtaining the squeeze forms no part of the present invention and is only illustrated generally and is the subject matter of another application (Ser. No. 557,256, filed Mar. 11, 1975 now U.S. Pat. No. 3,948,158) owned by the assignee of this application. Accordingly, as the meat material shrinks during the chilling operation, the meat material is squeezed so that the molds are maintained filled with the meat material and so that the final loaf product has a uniform cross-sectional dimension when it is removed from the molds following the chilling operation. In order to prevent horizontal swinging of the magazine 15 at the product squeeze stations within the chilling station, stops 64 and 65 are provided against which engage the adjacent stringer 35 to oppose the forces being horizontally applied by the plunger 63 and prevent driving of the magazines off the tracks 38 and 39. The stops 64 and 65 actually engage bars mounted on the stringer 35, as can be best seen in FIG. 7.

The meat material in the mold is cooked to a minimum internal temperature by using a recirculated hot water spray system. The cooking station 20 includes an elongated enclosed cooking chamber 70 through which the magazines are incrementally advanced. The cooking water is distributed through overhead spray nozzles 71 arranged along the cooking chamber. The cooking water temperature ranges from about 168° F. to 170° F., depending upon the products being handled. The cooking water is sprayed from the nozzles 71 onto the upper molds of each magazine and then cascaded from mold to mold down the magazines. The floor of the cooking station slopes transversely to the cooking chamber to three collecting sumps at the lower side of the cooking area. The three sump drains indicated by the numerals 72, 73 and 74 join together prior to entering a cook water recirculation tank. The cook water is continuously screened and is suitably heated such as by direct steam injection. The volume of water flow through the nozzles is such as to provide the desired cooking operation during the time the magazines are moving through the cooking station. No air is exhausted from the cooking chamber 70 so that formation of air currents are minimized which might result in uneven cooking. Accordingly, the cooking in the cooking chamber 70 accomplishes the cooking of the meat material in the molds.

While not shown, it will be appreciated that additional nozzles may be provided in the cooking chamber for purposes of clean-up of the cooking chamber and the apparatus therein. While any type of a spray arrangement may be utilized, it has been found that rotating spray heads mounted between and on both sides of the magazine rails, moving bars and locking bars provide optimum coverage for covering the entire cooking chamber with a sanitizer solution and subsequent rinse.

The chilling station 22 includes an elongated housing defining a chilling chamber 77 through which the magazines are incrementally transported during the chilling operation. Transfer of the magazines from the outlet end of the cooking chamber to the inlet end of the chilling chamber is accomplished by the lowerer 21 which is in the form of a movable rail section that receives a magazine when it is positioned in alignment with the cook rails, lowers the magazine until the rail section is in line with the chilling rails, and then allows the magazine to be drawn into the chilling chamber by the moving and locking rails of the walking beam conveyer in the chilling station.

The meat material in the molds which may now be defined as loaves when the magazines of molds are moving through the chilling chamber may be chilled to any desired internal temperature, such as about 85 degrees F. by using a recirculated cold water spray system. Overhead spray nozzles 78 are provided in the chilling chamber 77 for distribution of the water onto the uppermost molds of each of the magazines and then for cascading down to the lower molds and ultimately collected in a sump at the lower end of the chilling chamber. The water temperature when it leaves the spray nozzles may be, for example, about 34 degrees F. and the recirculated water is cooled by any suitable refrigeration system. The recirculated chilling water is continuously screened as was the cooking water. The volume of water issuing from the spray nozzle 78 is sufficient to accomplish the necessary cooling action during the time the magazines of molds are moving through the chilling chamber. Accordingly, the temperature and volume of the chilling water is coordinated with the magazine transport time in the chilling chamber to obtain the desired cooling of the meat product. Like in the cooking chamber, rotating sprayheads may also be provided for cleaning the chilling chamber when so desired. Suitable access doors are provided on both the chilling chamber housing as well as the cooking chamber housing to allow for internal inspection and maintenance.

In the first position outside of the chilling chamber, which is represented diagrammatically by the magazine of molds 80 in FIG. 5, the covers 60 of the molds are removed to thereby ready the molds for knockout of the product. At this point, the magazine spacing is automatically increased from eight inches to 32 inches to provide more operating space for the subsequent operations of product knockout, mold washing, and mold release agent application.

The product knockout apparatus is illustrated in FIG. 8, wherein the magazine 15 of molds is positioned to be in alignment at one end with knockout wands or bars 83 and at the other end with product receiving trays 84. In order to prevent horizontal swing of the magazines during the knockout, stops 85 and 86 are provided to resist the horizontally applied knockout force which might otherwise push the magazine off the rails. To prevent swing of the magazine along the pivot axes of the wheels and to locate them accurately, a spring loaded friction brake attached to the locking bar dampens the swinging and an indent in the stationary rails 38, 39 accurately positions the particular magazine that is being worked on at the knockout, squeeze, wash and release stations. The knockout bars 83 are slidably supported in sleeve bearings 87 and are connected together by a common vertically arranged drive bar 88 which is reciprocally driven along guide rails 89 and 90 supported between vertical frame members 91 and 92. Drive bar 88 is reciprocally driven by a rotary actuator 93 that is driven hydraulically through gears and sprockets 94 to drive chains which are connected to the bar holder 88 for advancing the knockout bars the full length of the molds. Each bar first contacts the plastic plug in the ratchet end of the mold and then drives it the entire length of the mold until the product has been delivered onto the receiving trays 84. The receiving trays 84 are pitched to allow the loaves of meat to slide down against a detented stop 95. Stops 95 may be rotated out of the way for removal of the loaves by hand when desired. At the leading ends of the receiving trays, above the lowermost tray, splash deflectors 96 prevent any possible liquid that may be squeegeed out of the mold by the loaf meat during knockout from falling down onto the next lower loaf of meat. Once the meat has been ejected from the molds, the knockout bars 83 are retracted to their positions, as shown in FIG. 8, so that the magazine may then be moved out of the knockout station. The product knockout mechanism and receiving tray assembly, as shown in FIG. 8, forms no part of the present invention and is only set forth to explain with better clarity the operation of the overall process. The mechanism at this station forms the subject matter of a separate application (Ser. No. 557,299, filed Mar. 11, 1975 now U.S. Pat. No. 3,990,357) owned by the assignee of this application.

The mold wash station 24 and the mold release agent application 25 both include apparatus that are similar in nature in that they both provide enclosures within which the magazines are indexed after which the wash and release agent application functions are carried out. While these stations provide no part of the present invention, as they are the subject matter of a separate application (Ser. No. 557,309, filed Mar. 11, 1975 owned by now U.S. Pat. No. 3,964,433) the assignee of this application, a general description will be given to facilitate understanding the overall process. However, it should be appreciated relative to the overall process the wash and release agent application apparatus could be other than what is contemplated here.

The wash station includes a housing within which the magazines are positioned and doors are provided to completely enclose around the magazines after which spray nozzles are moved over the exterior of the molds and also spray nozzles are moved within the interior of the molds to obtain the proper washing function of the molds. High pressure hot water spray wash on the exteriors and on the interiors provide the necessary washing action of the molds. Further, wands carrying nozzles to the interior of the molds, when they are inserted within the molds from the flanged end of the mold, reposition the plastic plugs at their normal ends such that they are slightly open from the ends to allow complete washing action. The washing program here may be varied depending upon the needs. The covers 60 are supported on pins 60a mounted on the lower three molds and the covers are also then washed during the movement of nozzles over the exterior of the molds. Accordingly, a spray wash is accomplished of the molds and the covers in the wash station 24. Preferably, air is continually exhausted from the mold wash chamber, thereby minimizing fog when the doors are open to admit and exit magazines.

Prior to stuffing of the molds, the interiors of the molds are coated with a very thin layer of approved release agent at the release agent application station 25. A housing similar to that of the wash station, wherein doors are opened and closed for the entrance and exit of magazines, is provided at the release agent application station. Further, nozzles are inserted within the molds to coat the interior of the molds with the release agent. Any suitable type of release agent may be employed here. One that is satisfactory is a mixture of soybean oil and lecithin, where in percentage by weight there may be 85 to 90 percent soybean oil and 10 to 15 percent lecithin. It is also preferable that the release agent be liquid at room temperature.

The entire loaf making process equipment is monitored and controlled by electronic programmable controllers, wherein the time cycles can be varied in accordance with a particular type of product being cooked. An example of the type of product that may be processed in this system is what is defined as "honey loaf" by the assignee of the application, Oscar Mayer & Co. Cook time at the cooking station 20 is about 3 hours and 26 minutes where the cook water is at about 168° F. and the internal temperature of the product at the end of the cooking cycle reaches about 156° to 157° F. The chill time in the chill station 22 is about 1 hour and 56 minutes where the chill water is at 34° F. At the end of the chill time the internal temperature of the product is about 74° – 76° F. It can be appreciated that any desired meat material may be processed to provide a desired loaf meat product, and the cooking times as well as the chill times can be varied in order to properly obtain a ready-to-eat product.

In view of the foregoing, it can be appreciated that the present invention provides a method and apparatus for continuously making a loaf meat product from a stuffable meat material by utilizing in a closed system a plurality of magazines of molds sequentially movable through stations performing operations on the molds to provide a desired end product.

It will be understood that modifications and variations may be effected without departing from the scope of the novel concepts of the present invention, but it is understood that this application is to be limited only by the scope of the appended claims.

The invention is hereby claimed as follows:

1. A method of continuously making a loaf meat product from a stuffable meat material, wherein a plurality of magazines of molds are sequentially moved in order through release agent application, stuffing, cooking, chilling, knockout and wash stations, and where the release agent application, cooking, chilling, knockout and wash stations are in a closed loop and said stuffing station is outside said closed loop, which method comprises the steps of: incrementally advancing the magazines around the closed loop through the stations, removing magazines one at a time from the closed loop downstream from the release agent application station and advancing same to the stuffing station, stuffing the molds in the magazines at the stuffing station with a meat material, and reinserting the magazines one at a time into the closed loop upstream of the cooking station.

2. The method defined in claim 1, which further includes the step of applying a squeezing force to the meat material in the molds during movement of the magazines through the chilling station.

3. The method defined in claim 1, wherein the step of incrementally advancing the magazines in the closed loop includes the step of applying a release agent to the molds, subjecting the molds stuffed with meat material to heat such that a given temperature in the center of the meat material is reached and the meat material is cooked, subjecting the molds with cooked meat material to a chilling action such that a given temperature in the center of the meat material is reached, removing the cooked and chilled meat material from the molds, and washing the molds.

4. The method defined in claim 3, wherein the molds are elongated tubular in form and during the step of subjecting the molds to a chilling action subjecting the meat material in the molds to a squeezing force to compensate for contraction and maintain the meat material sized to the mold dimensions.

5. The method defined in claim 4, wherein the step of subjecting the molds to heat for cooking the meat material includes advancing the magazines of molds through a closed chamber and spraying water of a given temperature onto the molds in the chamber.

6. The method defined in claim 5, wherein the step of subjecting the molds to a chilling action includes advancing the magazines of molds through a closed chamber and spraying water of a given temperature onto the molds in the chamber.

7. A method of continuously making a molded food product from a stuffable food material, wherein a plurality of magazines of molds are incrementally advanced along a closed loop along which are located in order release agent application, cooking, chilling, product knockout and mold wash stations, and at one point removed from the closed loop to a stuffing station and thereafter reinserted in the closed loop upstream of the cooking station, which method comprises the sequential steps of: applying a mold release agent to the interiors of the molds of a single magazine at the release agent application station, advancing the magazines of molds from the release agent application station to a given point in the closed loop, removing a magazine of molds from the closed loop at said given point and transferring it to a storage area, moving the magazine of molds from the storage area to the stuffing station, stuffing the molds with food material, transferring the magazine of molds from the stuffing station to the closed loop upstream of the cooking station, advancing the magazine of molds through the cooking station and subjecting the molds to heat for cooking of the food material to define a molded food product, advancing the magazine of molds from the cooking station to and through the chilling station and subjecting the molds to a cooling action to cool the food material, advancing the magazine of molds to the product knockout station, removing the molded food product from the molds at the product knockout station, advancing the magazine of molds to the mold wash station, and washing the molds of the magazine at the mold wash station.

8. A method of continuously making a molded food product from a stuffable food material, comprising the steps of: incrementally advancing a plurality of magazines of molds through a closed loop along which are located in order release agent application, cooking, chilling, product knockout and mold wash stations and periodically removing a magazine from the closed loop downstream of the release agent application station and transferring same to a stuffing station, stuffing the molds with a raw food material, reinserting the magazine of molds stuffed with the food material into the closed loop upstream of the cooking station and at the same time removing another magazine of molds from the closed loop for stuffing, cooking the food material at the cooking station to define a molded food product, chilling the cooked product at the chilling station, and removing the product from the molds at the product knockout station.

9. The method as defined in claim 8, which further includes the step of squeezing the product in the chilling station to force it against the sides and ends of the molds and provide a uniform final product when it is removed from the molds.

10. The method as defined in claim 9, which further includes the steps of washing the molds after the product is removed and applying a release agent to the molds prior to the next stuffing operation.

11. A method of continuously making loaf meat from a stuffable meat material which comprises the steps of incrementally moving a plurality of magazines of molds through a closed loop, removing the magazines one at a time from the closed loop, moving the removed magazines through a stuffing station, stuffing the molds of the magazines with a meat material, reinserting the magazines with stuffed molds one at a time into the closed loop, said step of moving the magazines through the closed loop including in order the further steps of subjecting the molds to heat for cooking the meat material, subjecting the molds to a chilling action to chill the cooked meat material, removing the meat material in the form of loaves from the molds, washing the molds, and applying a release agent to the molds prior to the stuffing thereof.

12. The method as defined in claim 11, wherein the step of subjecting the molds to heat includes the application of a hot water spray to the molds.

13. The method as defined in claim 12, wherein the step of subjecting the molds to a chilling action includes the application of a cold water spray to the molds.

14. Apparatus for continuously making a loaf meat product from a stuffable meat material comprising, a plurality of magazines each of which includes a plurality of loaf molds, means for stuffing the molds with a meat material at a stuffing station, means for incrementally advancing the magazines around a closed loop having in order means for cooking the meat material in the molds to define a loaf meat product, means for chilling the product in the molds, means for removing the product from the molds, means for washing the molds, and means for applying a release agent to the molds, and means for removing magazines of molds one at a time from the closed loop immediately upstream of the stuffing station whereby said magazines are transferred to said stuffing station, and means for returning the magazines of molds one at a time back into the closed loop upstream of the means for cooking.

15. Apparatus as defined in claim 14, wherein means is provided at the chilling means for squeezing the cooked meat material in the molds.

16. Apparatus as defined in claim 15, wherein said product squeezing means includes a plurality of squeezing mechanisms to effect squeezing at a plurality of positions.

17. Apparatus as defined in claim 15, wherein said cooking means includes means for applying a hot water spray onto the molds.

18. Apparatus as defined in claim 16, wherein said chilling means includes means for applying a cold water spray onto the molds.

* * * * *